Nov. 21, 1950     H. H. SCHAUMANN     2,530,735
PURIFICATION OF TITANIUM HALIDES
Filed April 12, 1946
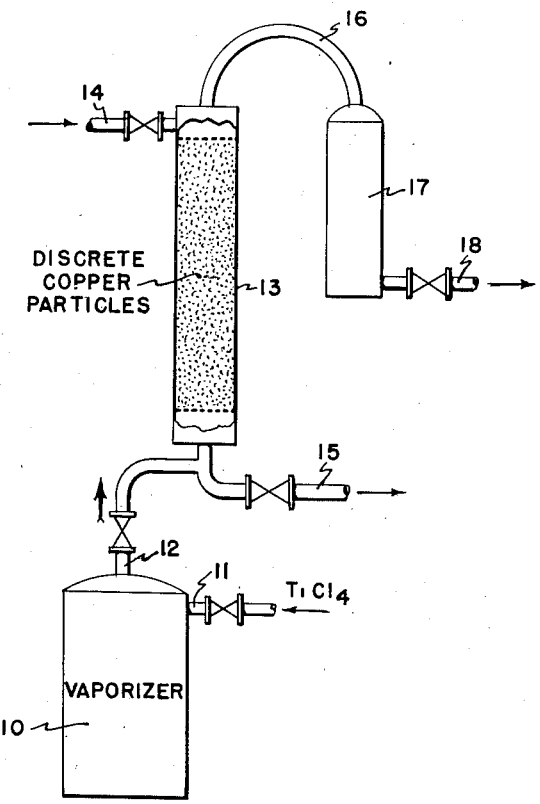
Holger H. Schaumann
INVENTOR.
BY John P. Hancock
ATTORNEY Patented Nov. 21, 1950

2,530,735

UNITED STATES PATENT OFFICE 2,530,735

PURIFICATION OF TITANIUM HALIDES

Holger Heinrich Schaumann, Newark, Del., assignor to E. I. du Pont de Nemours & Company, Wilmington, Del., a corporation of Delaware Application April 12, 1946, Serial No. 661,914

3 Claims. (Cl. 202—67)

This invention relates to production of relatively pure titanium tetrahalides and more particularly to the purification and decolorization of titanium tetrachloride.

In pure condition, titanium tetrachloride is a colorless, transparent, water-white liquid. As commonly prepared through chlorination of titanium-bearing ores, such as ilmenite, rutile, etc., however, it is more or less of pronounced yellow color. During the chlorination, other volatile chlorides than titanium tetrachloride are formed which must be separated and removed before the pure titanium compound can be obtained. Partial purification and separation of compounds such as ferric chloride and silicon tetrachloride having boiling points sufficiently removed from that of the titanium tetrachloride can be effected by fractional distillation. Certain other chlorides present, particularly those of vanadium (a distilled titanium tetrachloride obtained by chlorination of ilmenite ore will usually contain about 0.1% of vanadium) boil at temperatures close to the boiling point of the titanium tetrachloride, and hence prevent easy separation and removal of these undesired impurities by fractional distillation.

When titanium tetrachloride containing as low as .01% of vanadium is employed in the preparation of pigment titanium dioxide, a brown, discolored type of product results which is useless as a pigment. To insure production of a pigment having essential whiteness or color, removal of most of the vanadium present from the TiCl₄ is necessary before it can be used in pigment preparation.

It is among the objects of this invention to overcome the foregoing and other disadvantages which have characterized prior methods for obtaining titanium tetrachloride and to provide a novel method for obtaining that product in a form useful in preparing TiO₂ pigments. A further object is to effect the purification of crude titanium tetrachloride so as to provide a clear, water-white product. Additional objects include the provision of a method for effecting substantially complete separation of vanadium compounds from titanium tetrachloride, and in such manner that recovery is readily had of a usable form of vanadium as a valuable by-product. Other objects will appear from the ensuing description of the invention.

These objects are attainable in this invention which comprises subjecting an impure titanium tetrahalide, while in the vapor state, to the action of metallic copper.

In a more specific and preferred embodiment, the invention comprises distilling crude, anhydrous titanium tetrachloride containing at least .0003% by weight of vanadium as an impurity over metallic copper as a contact mass for the vaporized TiCl₄, and periodically removing precipitated vanadium compounds which form on said contact mass during said distillation.

In practically applying the invention in accordance with one preferred method, a conventional type distillation column is packed in a suitable manner with copper, in the form of discrete pieces so as to present a relatively large contact surface area. Examples of useful forms for the purpose include heavy copper turnings, copper Raschig rings, borings or similar cheaply-available scrap. The crude titanium tetrachloride, containing about .1% of vanadium, is then distilled, the resulting vapors being allowed to pass through the packed column in direct contact with copper particles, following which said vapors pass to a condenser in which the purified TiCl₄ product is collected for recovery. Preferably, some refluxing action is maintained during the operation in the upper portion of the distillation column in order to increase the time period during which the vapors are in contact with the copper. This, however, is not necessary if the column is sufficiently tall or if the surface area of the copper is sufficiently large to insure the requisite amount of contact. As the distillation and contacting operation progresses, a soft brown coating ultimately forms on the surface of the copper. This reduces the effectiveness of the treatment, as evidenced by the appearance of some yellow coloration in the titanium tetrachloride after its passage through the treating column. At this point the flow of TiCl₄ vapor through the column is discontinued and the copper is suitably reactivated by treatment with, preferably, dilute hydrochloric acid. This is conveniently effected by allowing the acid to percolate down over and through the copper packing or contact mass until it again presents a bright, metallic appearance. Any excess acid which remains after this treatment is removed by flushing the column with water, the copper being then thoroughly dried by any convenient method, such as passing a hot, inert gas through it. After treating the copper to effect its reactivation, further amounts of crude TiCl₄ are distilled thereover, the copper being equally effective in purifying the titanium tetrachloride as it was originally and being capable of use for another prolonged period before another activation treatment is required.

The solution which results from the hydrochloric acid wash of the copper packing will contain substantially all of the vanadium originally present in the titanium tetrachloride, together with some titanium and some copper compounds. By proper control of the washing operation and acid concentration, a relatively concentrated solution can be obtained from which vanadium, copper and titanium can be readily separated and recovered in accordance with known chemical means.

The accompanying single figure of drawing is a diagrammatic elevation of one useful form of apparatus in which the invention can be practiced. In such drawing a conventional vaporizer or still 10 is shown having an inlet 11 through which TiCl4 is fed for distillation through heating of said still and by any desired means. The TiCl4 vapors which are generated in the still 10 pass by means of conduit 12 into the bottom of a suitable distillation column 13 wherein during their upward passage therethrough they come in contact with discrete copper particles packed or otherwise suitably disposed and retained within said column. Provided in the upper portion of the column 13 is a suitably-valved conduit means 14 through which, when the flow of TiCl4 vapor through the column is discontinued and reactivation of the copper contact mass is desired, a reactivating acid or solution can be introduced to percolate down over and through the copper packing, to be subsequently withdrawn from the column via the valved discharge outlet 15 in communication with the bottom of the column 13 and vapor inlet means 12. The treated TiCl4 vapors after passage through the column 13 are discharged therefrom via conduit 16 into a conventional condenser 17 from which the purified TiCl4 distillate can be withdrawn via a valved discharge outlet 18 to storage or use.

To a clearer understanding of the invention the following specific examples are given, these being merely illustrative and not to be construed as in limitation of the invention:

Example I

Crude yellow titanium tetrachloride containing 94.5% TiCl4, 3.0% SiCl4, and 0.28% vanadium calculated as VOCl3, the remainder being ferric chloride and free chlorine, was distilled and the resulting vapors were passed through a copper-packed, vertical, steel column, the internal diameter of which was 8 inches and the height of which was 8.5 feet. The lower half of the column was filled with 200 pounds of metallic copper in the form of half-inch Raschig rings while the upper portion thereof was filled with porcelain rings. Some reflux was maintained constantly in the column, so that the temperature throughout was close to the boiling point of titanium tetrachloride (136–137° C.). The vapors leaving the copper-packed column were passed through a water-cooled condenser and into a collecting vessel.

In operating this unit, distillation was conducted until the temperature in the upper portion of the column reached 136° C., during which time substantially all of the silicon tetrachloride and chlorine, together with a small amount of titanium tetrachloride distilled over. The collecting vessel was then changed and distillation continued at a rate of 50 pounds titanium tetrachloride per hour, giving a water-white product. Distillation was continued until only a small portion of the original crude remained in the still pot. A new batch of crude was then added and the process repeated.

After production of 2800 pounds of water-white titanium tetrachloride in ten batches the copper packing was still performing satisfactorily without requiring any attention or cleaning. The combined water-white product was substantially free from vanadium, containing but negligible traces thereof, only 0.3 part per million.

Example II

Four parts by weight of the same type of yellow crude titanium tetrachloride described in Example I were placed in a conventional distillation vessel and distilled through a glass column containing copper packing in its lower portion and glass Raschig rings in its upper portion, and then to a condenser and collector. The copper packing was in the form of heavy turnings having a surface area of about 4 square centimeters per gram. Reflux was permitted to take place in the upper portion of the column, which was at a temperature of about 137° C. After distilling off the low-boiling fraction containing the silicon tetrachloride, distillation was continued at a rate of 500 cc. per hour until only a small dark residue remained in the flask. The main product, collected between 136° C. and 137° C., was water-white and found to contain over 99.0% TiCl4 and less than 0.0003% V.

The copper packing, which was now covered with a soft brown coating, was removed from the column and immersed in cold 20% hydrochloric acid until the bright luster was restored, after which the acid solution was decanted and the copper rinsed with water and dried for reuse. The acid solution, after addition of the rinsings, was analyzed and found to contain 4.45 grams vanadium, 6.0 grams titanium and 54.9 grams of copper per liter.

Example III

A glass column 1.5 inches in diameter and 18 inches high was filled with copper rings one-quarter inch in height and in diameter, and surrounded with an electric heating unit by which its temperature was maintained at 160° C. 900 cc. of yellow titanium tetrachloride which had previously been distilled to remove silicon tetrachloride, but which contained 0.1% vanadium, were placed in a flask and distilled through the heated copper-packed column at a rate of 500 cc. per hour. The vapors passing out of the column were conveyed to a condenser and a collecting flask. Care was taken to avoid any refluxing above the heated column, so that the titanium tetrachloride came in contact with copper only while in the vapor state.

The first 85 cc. of distillate contained a brown precipitate which rose to the surface after standing. The remaining 860 cc. which were collected were water-white and were found to be substantially free of vanadium.

While described above as applied to certain preferred embodiments, the invention is not limited thereto, since, as will be apparent to those skilled in the art, due variance may be made therefrom without departing from its underlying principles and scope. Thus, it is not essential that only the vapors shall come in contact with the copper during the distillation, since, as illustrated in Examples I and II above, it is often desirable to employ some reflux in the copper-packed column in order to increase the time of contact for a given column and to assist in separating other constituents such as silicon tetrachloride by fractional distillation.

When using a distillation column, the packing may conveniently comprise copper shavings, chips, turnings, rings, screen or other desired shapes, it being desirable to employ the copper in a form which offers a large area of contact with the gaseous chloride and yet provides a sufficiently porous packing to permit relatively free passage of the gaseous TiCl₄ therethrough. When very small or minute copper turnings are used, there is an undesired tendency for the packing to collapse after continued use with a consequent increased resistance to gas flow. It is generally more desirable and preferable, therefore, to use somewhat larger pieces of copper, particularly of the type described in the examples.

While recovery and removal of vanadium compounds from the copper packing can be effected by removing the packing and treating with, preferably, hydrochloric acid, it is often more desirable to perform this operation without packing removal. This may be accomplished by allowing the acid to trickle down through and over the copper column, by applying an acid spray to the top of the column, or by boiling a solution of the hydrochloric acid in such manner that the vapors thereof pass into the column for condensation, thus causing the column to function as a reflux condenser. For this purpose a constant boiling acid mixture (20.2% HCl) is most conveniently utilized.

While hydrochloric acid comprises a preferred type of acid for use herein, other solutions of inorganic or organic acids in non-oxidizing concentration can be employed. Examples of such additionally-useful acids include sulfuric, nitric, acetic, propionic, oxalic, etc. When nitric or other acids which in concentrated state attack copper are contemplated for use, they should be diluted to the point where they become non-oxidizing when used.

In purifying the titanium tetrachloride in accordance with this invention, optimum results accrue and substantially complete removal of vanadium will be found to take place when the rate of distillation is so adjusted that an average retention time of the vapors in the packed column of about seven seconds is had, with the temperature in the column being at about 137° C., and the copper packing has a surface area of about 15 square inches per cubic inch of column volume. Obviously, the necessary time of contact will vary with and depend upon the prevailing temperature, the amount of copper surface with which the vapors come in contact during the distillation, and the amount and type of impurities present in the crude tetrachloride being treated.

Care must be exercised in the process to keep moisture out of the system at all times, due to the ease with which titanium tetrachloride is hydrolyzed and to avoid excessive corrosion of the copper contact mass should moisture be present. If large amounts of chlorine are present in the crude titanium tetrachloride, it is desirable to effect removal thereof by predistillation, although, if desired, it is possible to combine its separation and vanadium removal in a single operation. While the presence of free chlorine does not prevent successful removal of vanadium, it does attack the copper and thereby shortens the effective life of the packing. Hence, chlorine removal prior to subjecting the TiCl₄ vapors to the action of copper is preferred herein. The presence in the crude titanium tetrachloride of substantial amounts of ferric chloride or silicon tetrachloride has no appreciable effect on the copper packing. Hence, separation of these materials by fractional distillation simultaneously with vanadium removal can easily be effected in the invention.

While treatment of titanium tetrachloride is principally contemplated under the invention, obviously other titanium halides, including those of bromine, iodine and fluorine can also be similarly treated and with advantageous, beneficial results. Similarly, though copper alone as a contacting mass can be used, if desired, it may be supported on suitable carriers, the latter being in the form of a gel or otherwise. Examples of suitable carriers include silica, titanium oxide, or other materials which are inert toward the vaporous halide under treatment.

As a result of the purification treatment herein contemplated, the recovered titanium tetrachloride will be in a highly pure state, and will contain less than 10 parts (and preferably less than 1 part) per million of vanadium, to render said chloride wholly adapted for use in the preparation of pigment-quality TiO₂. The exact manner in which the contemplated copper treatment functions to effect the removal of undesired vanadium impurities in accordance with the invention is not presently clearly understood by me, but it appears that the vanadium becomes converted to a less volatile or complex form from which the TiCl₄ is readily distilled.

I claim as my invention:

1. A method for purifying liquid TiCl₄ to effect substantially complete removal of vanadium present therein as an impurity, comprising heating said liquid to effect distillation thereof, passing the resulting vapors in the dry state through a distillation column and in direct contact with a mass of discrete copper particles maintained in said column as a contact mass, and periodically reactivating said copper contact mass through direct treatment with a non-oxidizing solution of an acid.

2. A method for purifying liquid TiCl₄ to effect substantially complete removal of vanadium present therein as an impurity, comprising heating said liquid to effect distillation thereof, passing the resulting vapors in the dry state through a distillation column wherein they come in direct contact with a mass of discrete copper particles maintained in said column, and periodically reactivating said copper contact mass by passing hydrochloric acid thereover.

3. A method for purifying liquid TiCl₄ to effect substantially complete removal of vanadium present therein as an impurity, comprising heating said liquid to effect distillation thereof, passing the resulting vapors in the dry state through a distillation column wherein they come in direct contact with a mass of discrete copper particles maintained in said column, and periodically washing said contact mass with hydrochloric acid to recover any vanadium compound which forms thereon as a result of said vapor contact and to effect its reactivation.

HOLGER HEINRICH SCHAUMANN.

REFERENCES CITED

The following references are of record in the file of this patent:

UNITED STATES PATENTS

| Number | Name | Date |
| --- | --- | --- |
| 1,466,435 | Hammond | Aug. 28, 1923 |
| 2,095,857 | Carter | Oct. 12, 1937 |
| 2,230,538 | Jeners | Feb. 4, 1941 |
| 2,375,198 | Alexander | May 8, 1945 |
| 2,412,349 | Meyers | Dec. 10, 1946 |

OTHER REFERENCES

Pamfilov et al., 31 Chem. Abstracts, 4609–4610 (1937).